(12) United States Patent
Krishnan et al.

(10) Patent No.: US 7,043,725 B1
(45) Date of Patent: May 9, 2006

(54) TWO TIER ARRANGEMENT FOR THREADS SUPPORT IN A VIRTUAL MACHINE

(75) Inventors: Venkatesh Krishnan, Sunnyvale, CA (US); Geetha Manjunath, Bangalore (IN); Devaraj Das, Bangalore (IN); Kommarahalli S. Venugopal, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/350,492

(22) Filed: Jul. 9, 1999

(51) Int. Cl.
*G06F 9/455* (2006.01)
*G06F 9/46* (2006.01)

(52) U.S. Cl. .......................... 718/1; 718/100
(58) Field of Classification Search ........ 709/100–108, 709/203; 718/1–108
See application file for complete search history.

(56) References Cited

U.S. PATENT DOCUMENTS

| | | | | |
|---|---|---|---|---|
| 3,858,182 A | * | 12/1974 | Delagi et al. ............... | 713/200 |
| 5,421,014 A | * | 5/1995 | Bucher ........................ | 709/100 |
| 5,619,710 A | * | 4/1997 | Travis et al. ................ | 709/203 |
| 5,630,128 A | * | 5/1997 | Farrell et al. ............... | 709/103 |
| 5,930,511 A | * | 7/1999 | Hinsley ...................... | 717/164 |
| 6,158,045 A | * | 12/2000 | You ........................... | 717/124 |
| 6,269,391 B1 | * | 7/2001 | Gillespie .................... | 709/100 |
| 6,314,445 B1 | * | 11/2001 | Poole .......................... | 709/1 |
| 2001/0049686 A1 | * | 12/2001 | Nelson ................... | 707/103 X |

* cited by examiner

*Primary Examiner*—Meng-Al T. An
*Assistant Examiner*—Kenneth Tang

(57) ABSTRACT

A software system with a two tier arrangement for threads support that enhances the adaptability of a virtual machine to differing platforms. The software system includes a virtual machine with a threads interface layer having a set of methods that provide thread support in the virtual machine according to a standard threads interface associated with the virtual machine. The software system includes a native threads interface layer that provides a set of methods that adapt the methods of the threads interface layer to a platform which underlies the software system. The native threads interface layer shields the virtual machine from the particulars of the underlying operating system while the threads interface layer provides a stable interface for application programs and other tasks that benefit from thread support in the virtual machine.

17 Claims, 3 Drawing Sheets

TWO TIER ARRANGEMENT FOR THREADS SUPPORT IN A VIRTUAL MACHINE

BACKGROUND OF THE INVENTION

1. Field of Invention

The present invention pertains to the field of software systems. More particularly, this invention relates to a two tier arrangement for threads support in a virtual machine.

2. Art Background

Computer systems and devices having embedded processing resources are typically implemented in a variety of differing architectures. Each architecture is usually defined by a particular instruction set, hardware register set, and memory arrangement, etc. In addition, such computer systems and devices typically include an operating system which is adapted to its particular architecture. The operating system and architecture provide a platform for execution of software tasks.

Typically, software tasks such as application programs which are written or compiled to be executed on a particular platform may be referred to as native code. A software task in the native code of a particular platform usually does not run on other non compatible platforms.

A virtual machines is a software environment that enables application programs to execute on a variety of differing platforms. The application programs which execute under such a virtual machine usually take the form of a stream of instructions each of which conforms to a predefined instruction set supported by the virtual machine. A virtual machine implemented on a particular platform typically interprets each of the instructions in the stream and provides emulation of the instructions in the native code of the particular platform. In addition, a virtual machine may include threads support. Threads support may be defined as functionality that enables the parallel execution of multiple software tasks each of which is referred to as a thread.

One example of a virtual machine that enables application programs to execute on a variety of differing platforms and that provides threads support is a Java virtual machine. A typical Java virtual machine functions as an interpreter for Java application programs. A Java application program typically take the form of a stream of Java byte code instructions and the Java virtual machine emulates each Java byte code instruction using the native code of the particular platform under which the Java virtual machine executes. A typical Java virtual machine provides threads support which is defined by the java.lang.Thread class.

A typical virtual machine invokes various services provided by the operating system of the underlying platform including services that provide threads support. Typically, the nature and extent of such operating system services varies among operating systems. For example, some operating systems provide extensive threads support services while other operating systems provide little or no threads support services. In addition, the details of any threads support services usually varies widely among operating systems. Such variation in operating system services usually complicates the process of adapting a virtual machine to different platforms. Unfortunately, such complications usually increase the development time and cost of implementing virtual machines on different platform. Moreover, such complications usually increase the cost of software support for virtual machines on different platforms.

SUMMARY OF THE INVENTION

A software system is disclosed with a two tier arrangement for multi threading in a virtual machine that enhances the adaptability of the virtual machine to different platforms. The two tier arrangement includes a threads interface layer in the virtual machine and an underlying native threads interface layer. The threads interface layer includes a set of methods that provide thread support in the virtual machine according to a standard threads interface associated with the virtual machine. The native threads interface layer includes a set of methods that adapt the methods of the threads interface layer is to a platform which underlies the software system.

The threads interface layer provides a stable interface for application programs and other tasks that benefit from thread support in the virtual machine. The interactions between the threads interface layer and the native threads interface layer are arranged to shield the virtual machine from the particulars of the underlying operating system, thereby enhancing portability of the virtual machine and ease of adapting to upgrades in the underlying operating system.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
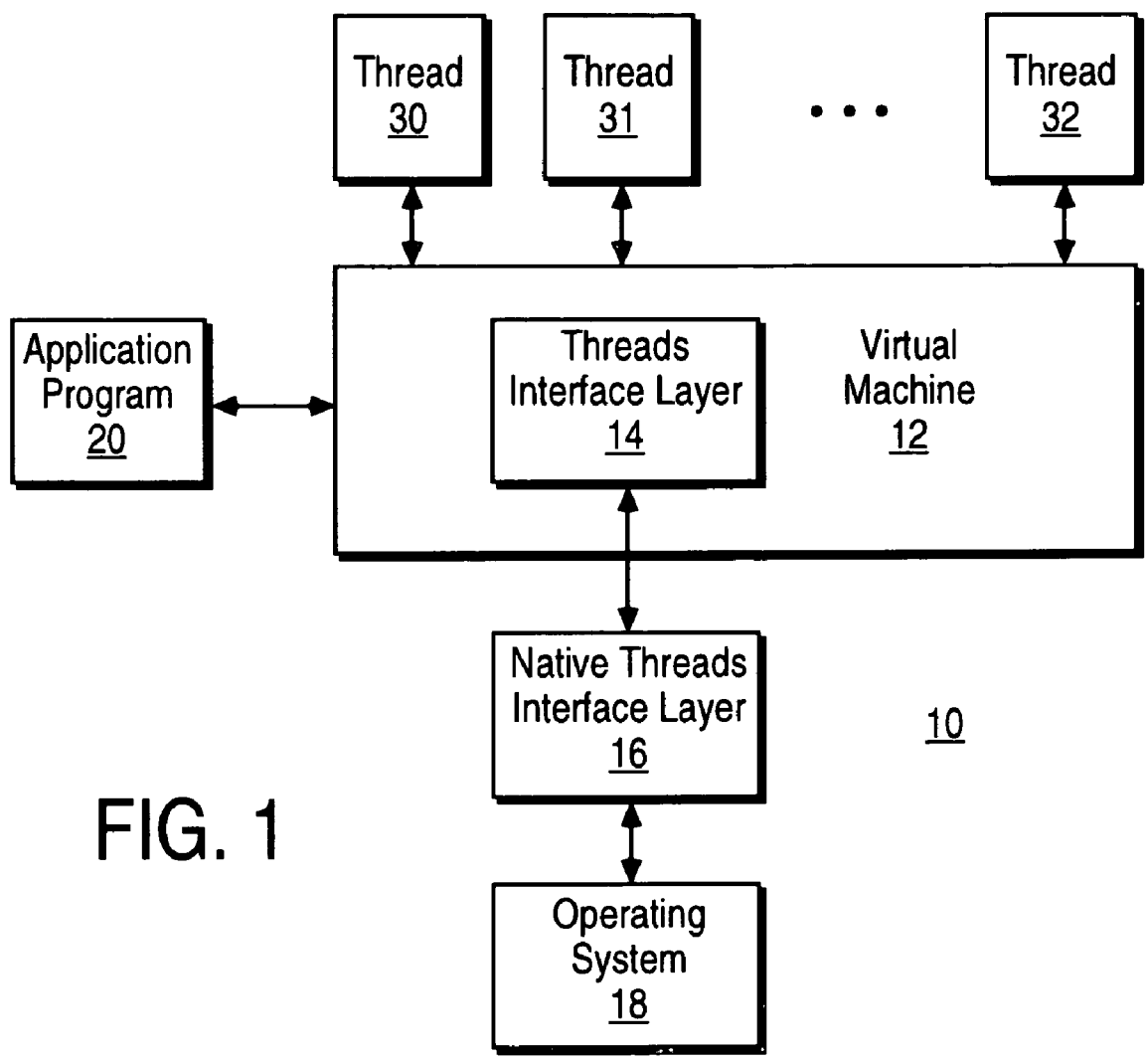
FIG. 1 shows a software system that includes a two tier arrangement for providing thread support in a virtual machine.

FIG. 1 shows a software system 10 that includes a two tier arrangement for providing thread support in a virtual machine 12 according to the present teachings. The software system 10 may be implemented on wide variety of hardware platforms including computer systems and devices having embedded processing resources.

The virtual machine 12 provides a software environment that enables execution of application programs such as an application program 20 on a wide variety of differing platforms. The virtual machine 12 provides a set of standardized programming interfaces to the application program 20 including standardized interfaces for multi-thread support.

In one embodiment, the virtual machine 12 is a Java virtual machine and the application program 20 is a java application. The following description focuses on an example embodiment in which the virtual machine 12 is a Java virtual machine. Nevertheless, the two tier arrangement for threads support in the software system 10 is readily adaptable to other types of virtual machines.

The software system 10 includes an operating system 18. The operating system 18 together with a particular hardware architecture for which it is implemented provides a platform for the software system 10. The operating system 18 may or may not provide threads support. In addition, any threads support that may be provided by the operating system 18 may differ in structure and function substantially from the structure and function of threads support defined by the standardized interfaces of the virtual machine 12.

The two tier structure for thread support according to the present techniques is embodied in a threads interface layer (TIL) 14 in the virtual machine 12 and a native threads interface layer (NTIL) 16. The TIL 14 provides a standard threads interface for the virtual machine 12 which does not depend on the underlying platform for the software system 10 while the NTIL 16 is adapted to the particulars of the underlying platform including the operating system 18 which underlies the virtual machine 12.

The two tier structure provided by the TIL 14 and the NTIL 16 enhances the portability of the virtual machine 12 to differing platforms having differing operating systems. For example, the virtual machine 12 may be ported to a different platform in which the TIL 14 provides the standard threads interface to software tasks that execute under the virtual machine 12 and in which an NTIL implemented for the different platform is used to adapt the TIL 14 to the particulars of the operating system of the different platform.

In addition, the two tier arrangement provided by the TIL 14 and the NTIL 16 simplifies adaptation of the virtual machine 12 to changes in threads support in the underlying functionality of the operating system 18. For example, the NTIL 16 may be modified or a new NTIL provided to adapt to the changes in the operating system 18. The TIL 14 remains unchanged and continues to provide the standard threads interface to the application program 20.

The two tier arrangement for thread support according to the present techniques is illustrated with respect to a set of threads 30–32 which are associated with the application program 20. The threads 30–32 may be defined as relatively small processes that share an address space and that are executed by the virtual machine 12 in parallel. The parallel execution may involve context switching among the threads 30–32 if the hardware platform for the software system 10 provides a single processor architecture. Alternatively, the threads 30–32 may execute concurrently if the hardware platform for the software system 10 provides a multi-processor architecture or a multi-thread processor in hardware.

The functions performed by the threads 30–32 generally depend on the nature of the application program 20. For example, if the application program 20 services a communication socket which receives hypertext transfer protocol (HTTP) commands then each thread 30–32 may have been created to handle a different HTTP command received via the communication socket.

In addition to threads created by application programs, there may be threads associated with the functionality of the virtual machine 12 such as threads associated with a garbage collection task or just-in-time compiler task to name a few examples. These are just a few examples of the use of threads and it will be appreciated that are numerous other uses for threads in the software system 10.

Each of the threads 30–32 has a context in terms of the virtual machine 12 and a context in terms of the underlying platform of the software system 10 including the operating system 18. The TIL 14 maintains the context the threads 30–32 in terms of the virtual machine 12. In one embodiment, the context of a thread in terms of the virtual machine 12 includes values in the interpreter registers in a Java virtual machine, i.e. the SP, PC, FP, LVP and NPC registers, and the base of the Java stack. The NTIL 16 maintains the context of the threads 30–32 in terms of the underlying platform of the software system 10. The context of a thread in terms of the underlying platform includes values of the machine registers in the underlying processor and the native stack of the underlying platform.

The TIL 14 provides support in the virtual machine 12 for spawning multiple threads such as the threads 30–32. In one embodiment, the TIL 14 is an implementation of the methods in the Java threads class java.lang.Thread and each of the threads 30–32 is viewed by the TIL 14 as a Java thread object. A Java thread object is an object that implements the run-able interface of Java application programming interface (API). The following is a list of the methods in the Java threads class in one embodiment.

run( )
start( )
stop ( )
suspend( )
resume( )
getThreadGroup( )
getPriority( )
setPriority( )
isDaemon( )
setDaemon( )
countStackFrames( )
join( )
interrupt( )
isInterrupted( )
interrupted( )
currentThread( )
activeCount( )
enumerate( )
dumpStack( )
yield( )
sleep( )
destroy( )

The methods in the TIL 14 have analogous methods in the NTIL 16 which are adapted to the underlying platform of the operating system 10. For example, the TIL 14 provides methods for spawning the threads 30–32 in terms of the virtual machine 12. The NTIL 16 includes analogous methods for spawning user level threads for the threads 30–32 in terms of the underlying platform of the software system 10. Similarly, the TIL 14 includes methods for suspending and resuming Java threads in terms of the virtual machine 12 and the NTIL 16 includes analogous methods of suspending and resuming the corresponding user level threads in terms of the platform that underlies the software system 10.

In the example embodiment, the spawn functionality of the TIL 14 is provided by an implementation of the start( ) method of the Java threads class. The spawning of a Java thread by the TIL 14 includes the allocation of the Java stack and initialization of the virtual machine registers SP, PC, FP, LVP and NPC for the Java thread. This creates the Java virtual machine context for the Java thread. The TIL 14 then uses analogous methods in the NTIL 16 to spawn a user level thread in terms of the underlying platform of the software system 10. The TIL 14 associates the user level thread created by the NTIL 16 to the Java thread.

The following illustrates the context of each thread 30–32 in terms of the virtual machine 12 in the example embodiment.

| JVM_byte | *pc; | > current program counter |
|---|---|---|
| JVM_byte | *npc; | > next program counter |
| int | sp; | > top of Java app stack |
| int | lvp; | > local variable pointer |
| int | fp; | > frame pointer |

```
JVM_word    *stack;     > base of Java app stack
char        *refstk;    > base of the reference stack
jmp_buf     jbuf;       > jump buffer for external
                          exceptions
```

In one embodiment, the thread support methods in the NTIL 16 are as follows.

```
Thread threadCreate( . . . )
int threadSuspend(Thread)
int threadResume(Thread)
int threadJoin(Thread)
int threadYield( )
int threadStop(Thread)
int threadSetPrio(Thread)
int threadGetPrio(Thread)
int threadCurrent( )
int scheduler( )
```

The NTIL 16 provides an API for the above-listed methods to the TIL 14. The methods in the TIL 14 use this API to send requests to the methods in the NTIL 16 to perform the particular threads functions in terms of the underlying platform of the software system 10. The API to the NTIL 16 is independent of the underlying platform for the software system 10 and is independent of the particular implementations of the methods in the NTIL 16. The following sets forth one possible embodiment of the methods in the NTIL 16.

The following structure is used to define a user level thread in the context of the underlying platform for the software system 10. PTHREAD refers to a user level thread in terms of the underlying operating system 18.

```
typedef struct thread_t{
    Lock        lock;       /* Lock for this thread structure
                               */
    pthread_t   pthr_id;    /* The id of the corresp. PTHREAD
                               */
    Utf8Const   *name;      /* The thread name */
    JVM_word    state;      /* The tread state */
    Object      *thrObj;    /* Object corresp. to this thread
                               */
    VmContext   vm;         /* Ptr to Virt. Mach. Rntime Info
                               */
    Thread_t    *nest;
} * Thread;
```

The NTIL 16 uses Thread as a pointer to a thread structure for a user level thread. Thread is an unsigned integer that is used as a thread identifier by the NTIL 16. The NTIL 16 maintains a global thread list (GTL) which is a linked list of all user level threads. One global lock is used for adding or deleting thread structures from the GTL. A thread identifier for a currently running thread is maintained in a global variable which changes every time the scheduler( ) method chooses to schedule another thread.

In this example embodiment, the NTIL 16 performs a context switch using a swapcontext( ) routine which is provided in a C implementation in the operating system 18. The swapcontext( ) routine swaps the internal registers and stack associated with the particular processor of the underlying platform of the software system 10.

Figure 2:
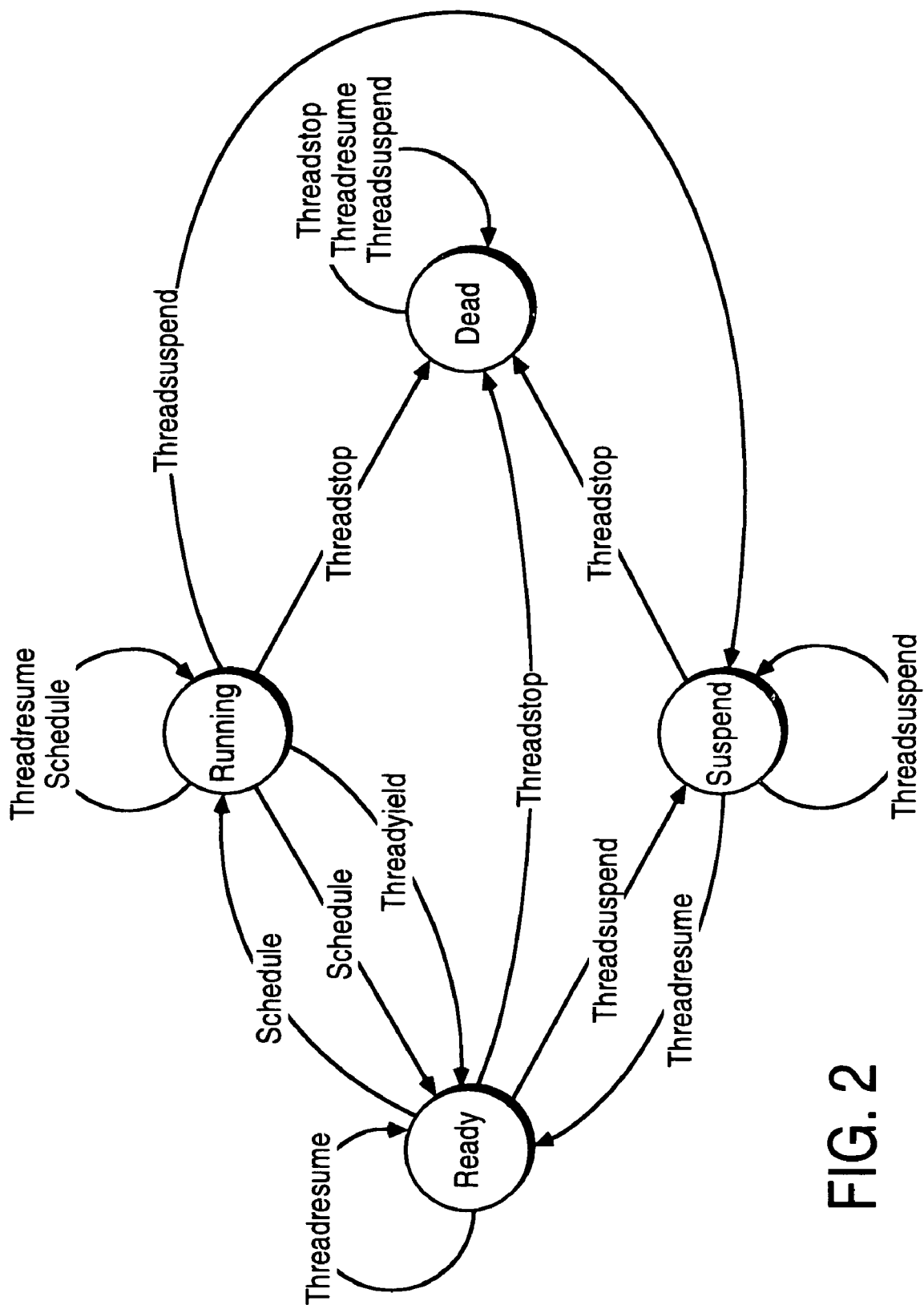
FIG. 2 is a state diagram showing the valid states of a thread in one embodiment.

FIG. 2 shows a state diagram for the threads 30–32 in one embodiment. The valid states of the threads 30–32 include a READY state, a SUSPENDED state, a RUNNING state, and a DEAD state. The state diagram shows the transitions among the states caused by the thread support methods in the NTIL 16.

The method threadCreate( ) creates a new user level thread by allocating a thread structure and calling threadSpawn( ).

```
Thread threadCreate(void* (*startRoutine)(void*), void *a
    rgs, Object *thrObj, Utf8Const *name)
{
    Allocate a Thread structure.
    Grab the lock for the global thread list (GTL).
    Fill in the defaults into the new Thread structure.
    Attach the current structure to the GTL.
    Set Thread State to READY.
    threadSpawn(&pthr_id,startRoutine, arguments);
    Return the lock for the GTL.
    Return the pointer to the Thread Structure.
}
```

The method threadSuspend( ) suspends the specified thread.

```
int threadSuspend(Thread t)
{
    Lock thread struct
    Set state of t to SUSPEND
    if (t is currentThread) {
        Unlock
        scheduler( )
    }
    else
        Unlock
}
```

The method threadResume( ) resumes the specified thread.

```
int threadResume(Thread t)
{
    if (t is currentThread)
        return
    Lock thread struct
    if (state of t is SUSPENDED)
        Set state of t to READY
    Unlock thread struct
}
```

The method threadJoin( ) waits for completion of the specified thread.

```
int threadJoin(Thread t)
{
    if (t is currentThread)
        return
check:
    Lock Thread Struct
    if (State of t is DEAD)
        Unlock and return
    Attach on the thread wait set
    Unlock
    threadSuspend(currentThread)
    toto check;
}
int threadJoinTimeOut(Thread t, long msec)
{
    if (t is currentThread)
        return
check:
    Lock Thread Struct
    if (State of t is DEAD)
```

```
   Unlock and return
   Attach on the thread wait set
   Unlock
   Set timer to wake up after msec.
   threadSuspend(currentThread)
   goto check;
}
   The method threadYield( ) yields the execution, i.e.
processor time, to some other thread.
int threadYield( )
{
   scheduler( )
}
   The method threadStop( ) is called to stop a specified
thread and to clean up some of the structures associated with
the specified thread.
int threadStop(Thread t)
{
   Lock Thread Struct
   Set state of t to DEAD
   Resume all threads waiting on t.
   Unlock
   Lock the GTL
   Remove t from the GTL
   Unlock GTL
   if (t==currentThread)
      scheduler( )
}
   The method threadSetPrio( ) sets the priority of the
specified thread.
int threadSetPrio(Thread Struct)
{
   Lock Thread Struct
   Set priority of t to prio, if valid
   Remove t and attach to appropriate place in list.
   Unlock
}
   The method threadGetPrio( ) returns the priority of the
specified thread.
int threadGetPrio(Thread Struct)
{
   Lock Thread Struct
   prio=priority of t
   Unlock
   return prio;
}
   The method threadCurrent( ) returns the identifier of the
currently running thread.
int threadCurrent( )
{
   return currentThread;
}
   The method scheduler( ) selects a thread for execution.
int scheduler( )
   Lock the GTL
   c=Select the highest priority READY thread from the
(list)
   queue.
   T=currentThread;
   if (c==t)
   return;
   if (c==NULL)
   Fatal Error : Dead Lock Condition
   Set state of c to RUNNING
   Put c in the state of list.
   set currentThread=c
   if (state of t is RUNNING)
      Set state of t to READY
   Attach t to appropriate place in list.
   Unlock GTL
   threadContextSwitch(t,c);
}
threadContextSwitch(Thread from,Thread to)
{
   switchVMachineContext(from,to)
   /*
   Make sure that out of all the pthreads corresponding to
Java threads only one pthread is READY at any given time.
   This ensures the actual scheduling of the required Java
application thread.
   */
   pthread_continue(to.pthr_id);
   pthread_suspend(from.pthr_id);
}
   threadSpawn(pthr_id, void* (*startRoutine)(void*), void
*arguments)
{
   Call pthread_create(&pthr_id,startRoutine,arguments)
}
```

In some embodiments, the native thread support routines of the NTIL 16 take advantage of thread support routines that exists in the operating system 18. For example, some UNIX operating systems and the LINUX operating system include an implementation of pthreads which may be used by the NTIL 16. This is illustrated by the example embodiment in which the operating system 18 includes the thread support routines pthread_create( ) and pthread_continue( ) and pthread_suspend( ) which are invoked by the routines threadContextSwitch( ) and threadSpawn( ) of the NTIL 16. The routine pthread_create( ) creates a new thread in the context of a processor under which the operating system 18 executes at a specified address. The routine pthread_create( ) is used to start a new execution context and it returns a thread identifier pthr_id for the new native thread. The routine pthread_suspend( ) takes a thread identifier pthr_id as an argument and is used to suspend the specified native thread. The routine pthread_continue( ) takes a thread identifier pthr_id as an argument and is used to resume the specified native thread.

In other embodiments of the software system 10, the operating system 18 provides thread support routines that perform equivalent functions to one or more of the native thread support routines of the NTIL 16. In such embodiments, the equivalent native thread support routines of the NTIL 16 perform a call to the appropriate thread support routine in the operating system 18. For example, if the operating system 18 includes a thread scheduler routine that performs the equivalent function of the scheduler( ) routine in the NTIL 16, then the scheduler( ) routine in the NTIL 16 calls the thread scheduler routine of the operating system 18. Other native thread support routines may be fully coded in the NTIL 16 if equivalents are not available in the operating system 18.

In other embodiments, one or more of the native thread support routines may be fully coded in the NTIL 16 whether or not equivalents are provided in the operating system 18. This insulates the NTIL 16 from changes to thread support in the underlying operating system 18.

Figure 3:
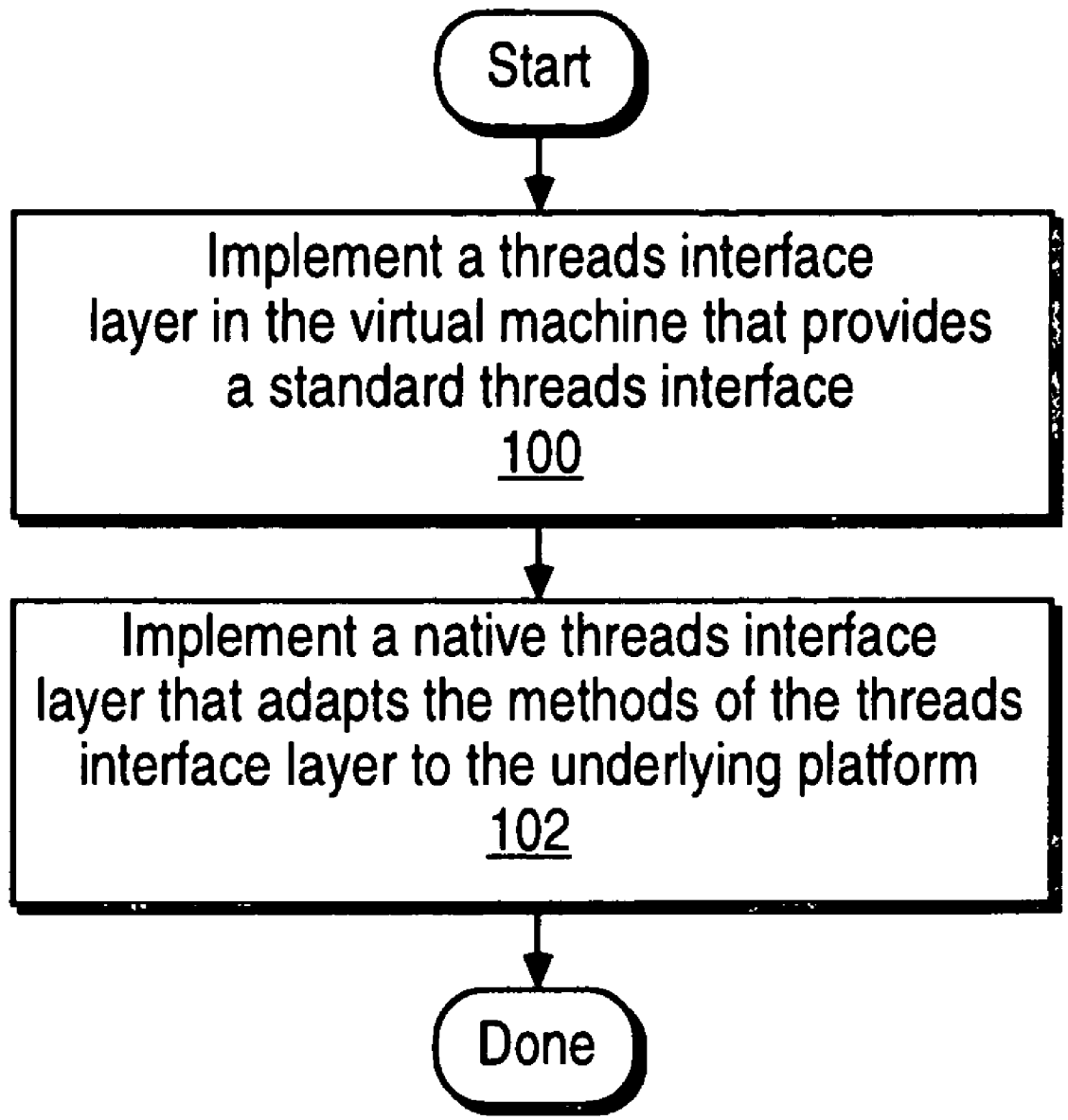
FIG. 3 shows a method for providing threads support for a virtual machine in a software system.

FIG. 3 shows a method for providing threads support for a virtual machine in a software system. The method steps shown may be used to adapt the virtual machine to a new platform or to adapt the virtual machine to changes in the underlying platform such as changes to the underlying operating system and/or hardware.

At step 100, a threads interface layer is implemented in the virtual machine. The threads interface layer includes a set of methods that provide thread support according to a standard threads interface associated with the virtual machine. The methods in the threads interface layer maintain a set of context information for each of a set of threads in the software system in terms of the virtual machine.

At step 102, a native threads interface layer is implemented. The native threads interface layer includes a set of methods that adapt the methods of the threads interface layer to the platform which underlies the software system. The methods in the native threads interface layer maintain a set of context information for each of a set of threads in the software system in terms of the platform. Step 102 may be used to adapt the virtual machine to changes in the underlying platform for a given virtual machine.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A system for adapting threads support in a virtual machine to an underlying platform of the virtual machine, comprising:
   threads interface layer (TIL) that provides a standard threads interface for a set of threads associated with an application program of the virtual machine such that the standard threads interface does not depend on the underlying platform;
   native threads interface layer (NTIL) for adapting the TIL to the underlying platform such that a set of routines in the TIL use a set of routines in the NTIL to support the threads;
   wherein the NTIL is adapted to an operating system of the underlying platform;
   wherein the NTIL is adapted to use a set of routines provided by the operating system that perform equivalent functions of functions in the native threads interface layer (NTIL);
   wherein the routines in the TIL maintain a set of context information for each thread in terms of the virtual machine; and
   wherein the routines in the NTIL maintain a set of context information for each thread in terms of the underlying platform.

2. The system of claim 1, wherein the NTIL is adapted to use a set of thread support routines provided by the operating system.

3. The system of claim 1, wherein the NTIL is adapted to a hardware architecture of the underlying platform.

4. The system of claim 1, wherein the standard threads interface is a Java threads class.

5. The system of claim 1, wherein the native threads support routines include a routine for suspending a particular thread.

6. The system of claim 1, wherein the native threads support routines include a routine for resuming a particular thread.

7. The system of claim 1, wherein the native threads support routines include a routine for waiting for completion of a particular thread.

8. The system of claim 1, wherein the native threads support routines include a routine for yielding execution to another thread.

9. The system of claim 1, wherein the native threads support routines include a routine for stopping execution of a particular thread and for cleaning up a set of structures associated with the particular thread.

10. The system of claim 1, wherein the native threads support routines include a routine for setting a priority of a particular thread.

11. The system of claim 1, wherein the native threads support routines include a routine for obtaining a priority of a particular thread.

12. The system of claim 1, wherein the native threads support routines include a routine for obtaining an identifier of a currently executing thread.

13. The system of claim 1, wherein the native threads support routines include a routine for selecting a particular thread for execution.

14. A method for adapting threads support in a virtual machine to an underlying platform, comprising:
   providing a threads interface layer (TIL) having a standard threads interface in the virtual machine for a set of threads associated with an application program that executes under the virtual machine such that the standard threads interface does not depend on the underlying platform;
   providing a native threads interface layer (NTIL) for adapting the TIL to the underlying platform such that a set of routines in the TIL use a set of routines in the NTIL to support the threads, wherein the routines in the TIL maintain a set of context information for each thread in terms of the virtual machine, and the routines in the NTIL maintain a set of context information for each thread in terms of the underlying platform;
   wherein providing an NTIL includes adapting the NTIL to an operating system of the underlying platform; and
   wherein adapting the NTIL to an operating system includes adapting the NTIL to use a set of thread support routines provided by the operating system.

15. The method of claim 14, wherein adapting the NTIL to an operating system includes adapting the NTIL to use a set of routines provided by the operating system that perform equivalent functions of functions in the NTIL.

16. The method of claim 14, wherein providing an NTIL includes adapting the NTIL to a hardware architecture of the underlying platform.

17. The method of claim 14, wherein providing an NTIL having a standard threads interface includes providing a Java threads class.

* * * * *

UNITED STATES PATENT AND TRADEMARK OFFICE
CERTIFICATE OF CORRECTION

| | | |
|---|---|---|
| PATENT NO. | : 7,043,725 B1 | |
| APPLICATION NO. | : 09/350492 | |
| DATED | : May 9, 2006 | |
| INVENTOR(S) | : Venkatesh Krishnan et al. | |

It is certified that error appears in the above-identified patent and that said Letters Patent is hereby corrected as shown below:

In column 2, line 13, after "layer" delete "is".

Signed and Sealed this

Fourth Day of August, 2009

JOHN DOLL
*Acting Director of the United States Patent and Trademark Office*